US008467996B2

(12) United States Patent  
Perez et al.

(10) Patent No.: US 8,467,996 B2  
(45) Date of Patent: Jun. 18, 2013

(54) SPECTRAL ANALYSIS OPERATING SYSTEM

(76) Inventors: Jorge E Perez, Albuquerque, NM (US); Richard T Meyer, Albuquerque, NM (US)

( * ) Notice: Subject to any disclaimer, the term of this patent is extended or adjusted under 35 U.S.C. 154(b) by 367 days.

(21) Appl. No.: 13/023,755

(22) Filed: Feb. 9, 2011

(65) Prior Publication Data

US 2012/0203510 A1    Aug. 9, 2012

(51) Int. Cl.
*H03F 1/26*    (2006.01)
*G06F 19/00*    (2011.01)

(52) U.S. Cl.
USPC .............. 702/189; 356/317; 600/544; 702/70

(58) Field of Classification Search
USPC .............. 702/22, 28, 30, 66, 70, 74, 76, 189, 702/198; 250/214 R, 305, 310, 343; 356/317, 356/327, 328, 451, 473; 600/310, 473, 476, 600/544
See application file for complete search history.

(56) References Cited

U.S. PATENT DOCUMENTS

| | | | |
|---|---|---|---|
| 5,435,309 A | 7/1995 | Thomas et al. | |
| 5,982,486 A | 11/1999 | Wang | |
| 6,415,233 B1 | 7/2002 | Haaland | |
| 6,574,501 B2 | 6/2003 | Lambert et al. | |
| 6,675,106 B1 | 1/2004 | Keenan et al. | |
| 6,748,334 B1 | 6/2004 | Perez et al. | |
| 6,862,535 B2 | 3/2005 | Binder | |
| 6,922,645 B2 | 7/2005 | Haaland et al. | |
| 7,119,904 B2 | 10/2006 | Coffin et al. | |
| 7,154,599 B2 * | 12/2006 | Adams et al. | 356/317 |
| 7,242,508 B2 | 7/2007 | Salomaa et al. | |
| 7,372,573 B2 | 5/2008 | Spartz et al. | |
| 7,373,198 B2 * | 5/2008 | Bibian et al. | 600/544 |
| 7,406,453 B2 | 7/2008 | Mundie et al. | |
| 7,598,494 B2 | 10/2009 | Shock et al. | |
| 2002/0059047 A1 | 5/2002 | Haaland | |
| 2005/0154539 A1 | 7/2005 | Butler et al. | |
| 2010/0027003 A1 | 2/2010 | Cappel | |
| 2010/0282958 A1 | 11/2010 | Will et al. | |

FOREIGN PATENT DOCUMENTS

WO    WO 2006/115490 A1    11/2006

OTHER PUBLICATIONS

ARIA: Self-Optimizing Specialty Gas Calibration Error Reduction Software (Perez, et al, PittCon Mar. 2009)—CIC Photonics.
Concentration Residual Augmented Classical Least Squares (CRACLS): A Multivariate Calibration Method with Advantages over Partial Least Squares (Haaland, et al, Applied Spectroscopy, vol. 56, Issue 5, pp. 615-624 (2002)).
Exploration of New Mutivariate Spectral Calibration Algorithms (Haaland, et al. 2004, Abstract).

* cited by examiner

*Primary Examiner* — John H Le
(74) *Attorney, Agent, or Firm* — Andrew Israel (57) ABSTRACT

Collecting and analyzing spectral data can be challenging when multiple analysis instruments need to be integrated and monitored by a quality control agent within a laboratory, industrial plant, field operation, or even an aerospace environment. The spectral analysis system and method, as presented, provides improved quality control, process control, and data management through unique feedback mechanisms between all hardware and software components within an analytical environment. Through spectral analysis presented, meaningful information is extracted from a spectral signal and fed back into the spectral analysis system to enhance overall system performance. A centralized database is provided to allow multiple users the opportunity to query the database for historical spectral records that can lead to the generation of meaningful reports. Additional hardware can be adapted to the present spectral analysis system in order to monitor a variety of physical phenomena in addition to monitoring a portion of the electromagnetic spectrum.

21 Claims, 4 Drawing Sheets

SPECTRAL ANALYSIS OPERATING SYSTEM

BACKGROUND OF THE INVENTION

1. Field of the Invention

This invention pertains to the universal analytic technique concerned with the measurement of the interaction (usually the absorption or the emission) of radiant energy with matter, with the instruments necessary to make such measurements, and with the interpretation of the interaction both at the fundamental level and for practical analysis. Furthermore, this invention relates, in general, to managing spectral data generated in a variety of settings, and in particular, to an integrated, automated spectral data management system that can be adapted to a particular analytical environment.

2. Description of the Background Art

The background to the present invention and related art can be understood by reference to Applicant's own prior work, including in particular, U.S. Pat. No. 6,748,334 B1 (the '334 patent) entitled "Specialty Gas Analysis System" which issued Jun. 8, 2004. The '334 patent is hereby incorporated by reference in its entirety, for all purposes, including, but not limited to, supplying background and enabling those skilled in the art to understand, make, and use in Applicant's present invention.

Traditional methods for collecting and managing spectral data rely on data collection and analysis performed through a personal computer (PC) connected directly to a spectrometer, or other data collection device. The spectrometer could comprise any type of instrumentation that can scan and report a portion of the electromagnetic radiation spectrum (i.e. microwave, far Infrared, mid-infrared, near infrared, visible, UV, THz, x-ray, etc). In traditional spectral data collections systems, the manufacturer's software is connected directly to the spectrometer, and the user is limited to the functionality and capabilities of the software. The manufacturer's software normally provides capabilities to manually export the spectral records into other formats available in the market for storing spectral records.

In a typical analytical environment, there can exist other instruments, besides a spectrometer, used to monitor a variety of physical phenomena, including pressure and temperature transducers, flow meters, electrochemical cells, flame ionization detectors (FIDs), residual gas analyzers (RGA), etc. In this environment, each instrument is connected to a separate PC used for collecting and analyzing the data generated by that particular instrument. A quality control agent is responsible for manually tracking the quality of all data collection instrumentation and therefore, each PC connected to each collection instrument. Traditional data collection systems can also provide management of other functions such as quality control, sample plannings, management of users, invoicing, and automating workflow. Traditional data collection systems can be implemented to support other areas of system management, including information gathering, decision-making, review and release of information into the workplace and away from the workplace. Data management, data mining, and data analysis can be integrated into these existing systems. Several types of data might need to be managed by traditional systems, including instrument parameters, lab personnel, quantification analysis, test procedures, process line ID, process point, calibration certifications, sampling matrix, gas matrix certification, instrument validation, spectral records, and gas tanks signal-to-noise ratio.

There are certain disadvantages to the traditional spectral data collection methodology, however. Since all the instrumentation and computing devices are arranged as "stand-alone" workstations, any record keeping and communication between the workstations within a data collection system must be done manually by the quality control agent. This is a very time consuming and cost prohibitive process. Assembling data between the various workstations within the system and generating reports based on the assembled data from these workstations is very labor intensive as well. The quality control agent must manually gather the data from each individual workstation in order to compile the data into a meaningful report. Another drawback to the traditional system is the limitation in the software developed for each stand-alone workstation. The software developed for each workstation is unique for that particular workstation and is not necessarily compatible with the software running on other workstations in the system. Training a quality control agent in the specifics of each type of software can be cumbersome and an inefficient use of time. Manufacture-specific software may have limited connectivity to third party spectral collection and analysis software. Therefore, extended spectral analysis functionality and integration of the data reported by the spectral analysis software into an automated data storage system is not possible with the current systems. What is needed is an integrated and automated spectral data collection system that can be used in a variety of settings for improved quality control, process control, and data management.

SUMMARY OF THE INVENTION

A spectral analysis system is provided that offers improved quality control, process control, and data management through unique feedback mechanisms between all hardware and software components. An embodiment provides a receiving module, connected to a collecting module, configured to receive an electromagnetic signal and convert the electromagnetic signal into an electrical signal suitable for electronics processing. Through spectral analysis, meaningful information is extracted from a spectral signal and fed back into the spectral analysis system in order to further enhance control of quality, processes, and data management. An embodiment further provides a database storage module for storing historical spectral records such that one or more than one user interface modules can query the database storage module to generate reports and to display any pertinent information related to the processes running within the spectral analysis system. An embodiment further provides additional hardware that can be adapted to the spectral analysis system to monitor a variety of physical phenomena in addition to monitoring a portion of the electromagnetic spectrum. Information extracted from the data generated from additional hardware can be fed back into the spectral analysis system to further enhance process control, quality control, and data management.

DETAILED DESCRIPTION OF DRAWINGS

Figure 1:
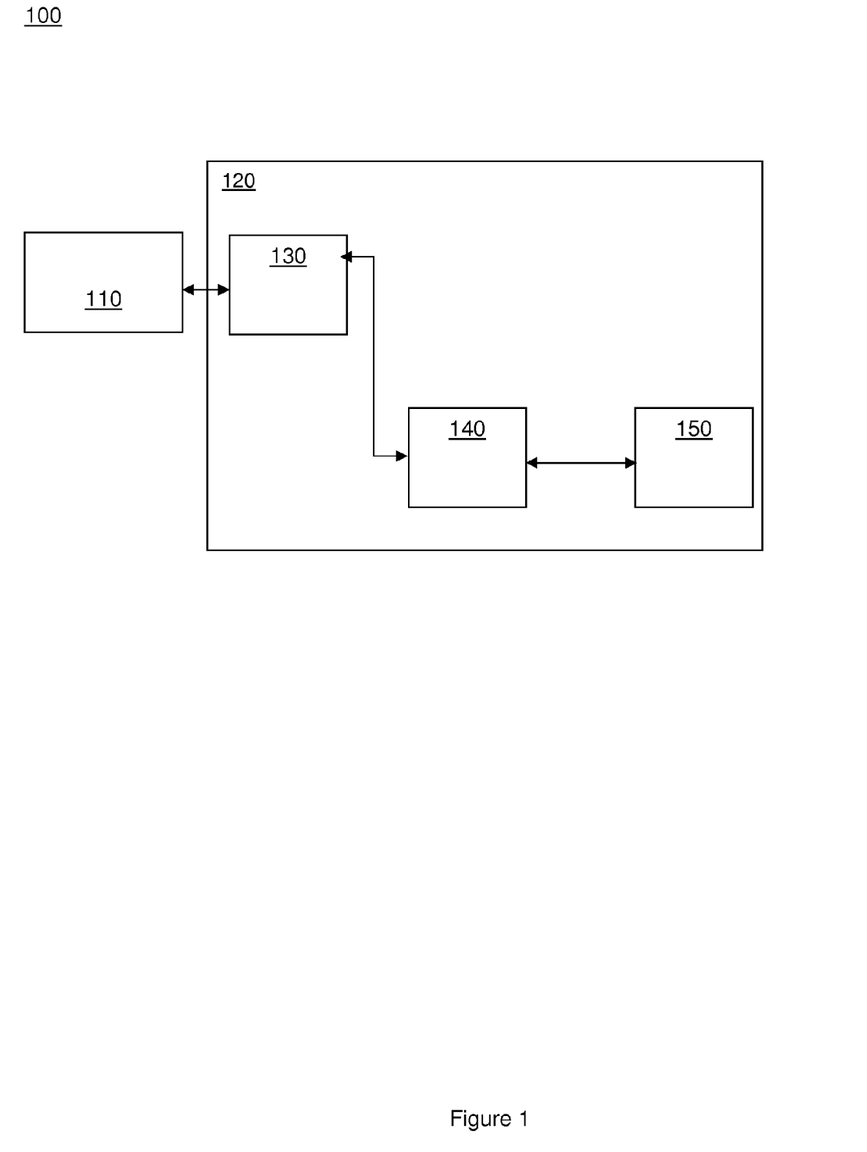
FIG. 1 is a block diagram of a system for collecting spectral data in accordance with an embodiment of the present invention.

FIG. 1 illustrates a system 100 for collecting spectral data in accordance with an embodiment of the present invention. Spectral data is generated by spectrometer 110. In an embodiment, spectrometer 110 comprises any type of instrumentation, including, but not limited to, spectroscopes, spectrographs, spectrophotometers, that can scan and report a portion of the electromagnetic radiation spectrum (i.e. microwave, far Infrared, mid-infrared, near infrared, visible, UV, x-ray, THZ, etc). Spectral records are automatically collected directly from the spectrometer 110 through the use of a specialized driver provided by the vendor of the instrument. Once spectral data has been generated by spectrometer 110, the spectral data is transmitted to workstation 120 via a direct, wired (or wireless) data connection. In an embodiment, workstation 120 is a personal computer. In an embodiment, workstation 120 comprises computer-readable media loaded on internal memory. The computer-readable media further comprising: a spectral collection module 130 configured to receive spectral data from spectrometer 110; a spectral analysis module 140 configured to analyze spectral data received from spectral collection module 130; and database storage module 150 electrically connected to spectral analysis module 140. In an embodiment, spectral collection module 130 is in electrical communication with spectrometer 110, spectral analysis module 140 is in electrical communication with spectral collection module 130, and database storage module 150 is in electrical communication with spectral analysis module 140. In an embodiment, database storage module 150 is selected from a list of commercially available databases, including, but not limited to analytical databases, data warehouses, distributed databases, end-user databases, external databases, hypermedia databases, MySQL, Oracle, or Microsoft SQL Server.

Spectral collection module 130, in direct electrical communication with spectrometer 110, requests and processes all the spectral information, operations, and diagnostics of spectrometer 110. Spectral collection module 130 receives an electrical signal from spectrometer 110 and converts the electrical into a second electrical signal suitable for processing by spectral analysis module 140. In an embodiment, the second electrical signal is spectral data generated by spectrometer 110. By design, for every different type of spectrometer 110 that needs to be controlled, there will be a specific spectral collection module 130 for that particular spectrometer 110. Spectral collection module 130 also has the capacity to select which spectrometer (from a group of spectrometers) to use when there is more than one spectrometer connected to system 100. All spectral data generated by spectrometer 110 is automatically stored inside the storage database module 150. In an embodiment, spectral collection module 130 sends the spectral data to the database module 150 through the spectral analysis module 140 as individual data packets. In an embodiment, spectral collection module 130 collects spectral data according to the needs of a particular application. In an embodiment, spectral collection module 130 collects spectral data in an interferogram, raw spectrum, absorption, transmission, or a single beam format. In an embodiment, spectral collection module 130 collects the spectral data based on one or multiple co-added scans to improve the signal-to-noise (S/N) ratio. In addition with collecting spectral data, the spectral collection module 130 has the capability to create a spectral record, which includes spectral data generated by spectrometer 110 and additional information. In an embodiment, a spectral record is a collection of spectrum plots for all analytical signals within a specific range of wavelengths for a given chemical sample. In an embodiment, spectral collection module 130 creates a spectral record with information, including, but not limited to, the ZDP point, signal intensity, temperature, or the background moisture level of the interferogram. All this information is stored, along with the spectral data, within the spectral record as part of a set of spectral collection parameters. In an embodiment, the spectral collection module 130 will collect and store as much information as possible, within a spectral record, about the status of spectrometer 110, including, but not limited to, the throughput of any gas cell attached to system 100, spectral shift, spectral signal intensity (peak heights or areas or fullwidth/half-width at half maximum (FWHM/HWHM), wavelengths, or any erroneous spectral scans. Each spectral record consists of predefined fields where the spectral parameters and spectral records can be independently stored, each inside its own field. In an embodiment, the set of spectral collection parameters are stored within a database table contained within the database storage module 150. In an embodiment, the spectral collection module 130 associates all the collected spectral data with a given process identification number for ease of tracking. In an embodiment, spectral collection module 130 also catalogues the spectral records according to the process ID, workflow, work order number, or any meaningful identification number. In an embodiment, spectral collection module 130 will monitor the connectivity with spectrometer 110 and perform automatic reconnection with spectrometer 110 when needed and provide alerts when problems arise with the connectivity to spectrometer 110. In the case that problems arise with spectrometer 110, spectral collection module 130 will issue alarms in response to these problems. Examples of situations where spectral collection module 130 will issue an alarm include, but are not limited to, communication error with the spectrometer 110, low signal intensity, or spectrometer 110 reports an error condition. In an embodiment, spectral collection module 130 will keep an event log of the performance of the entire system 100.

The spectral analysis module 140, in direct electrical communication with spectral collection module 130 and database storage module 150, provides the tools to process spectral data (or spectral record) and extract specific information, like the throughput of any gas cell attached to system 100, spectral shift, spectral signal intensity, peak heights or areas or fullwidth/half-width at half maximum (FWHM/HWHM), wavelengths, etc., from the spectral data (or spectral record) so the spectral collection module 130 and database storage module 150 can receive this information as a feedback into the automation of the entire system 100. Through the feedback mechanisms present, system 100, system has the capability of running autonomously, without the requirement of human intervention, for the completion of a specific task or series of tasks. This tasks can include, but are not limited to, controlling gas manifold systems, the collection of spectral records, and quantification analysis of spectral data (or spectral records). Based on the information that is transmitted from the spectral analysis module 140 into the spectral collection module 130 and/or transmitted to the database storage module 150, significant enhancement of the quality of the processed spectral data can be achieved. Once the system 100 is automatically collecting the spectral data, together with all the relevant information that is related to a particular sample that is being analyzed (time, temperature, pressure, process ID, system status, etc), spectral analysis module is capable of creating a complete spectral record of all the conditions surrounding the analysis of the particular sample in question. This complete spectral record provides a validation for all the processes being carried out within system 100 at a given time.

Furthermore, in an embodiment, Spectral analysis module 140 can issue commands to all modules within workstation 120. Examples of commands issued by spectral analysis module include, but are not limited to: collect a reference spectrum (spectral data); collect a sample spectrum; start continuous reference and sample spectrum; stop collection; adjust signal gain; modify scan time; change instrument resolution; or change wavelength range to scan. In an embodiment, the commands issued by spectral analysis module 140 are based on the information extracted from the spectral data (or spectral record) received from spectral collection module 130. In an embodiment, the spectral analysis module 140 facilitates the creation of a new calibration group or series of calibration groups during the calibration of system 100. A calibration group is a collection of spectral records for which the quantitative relationship between each spectral signal strength, and its concentration, has been established. After the spectral analysis module 140 creates a calibration group, the spectral analysis module 140 transmits the calibration group to the database storage module 150 for storage. The spectral analysis module 140 automatically assigns a serial number to a calibration group. In an embodiment, spectral analysis module 140 automatically assigns an expiration date to each calibration group. Spectral analysis module 140 also validates and adjusts calibration groups before a final validation takes place. During validation the spectral analysis module 140 collects real calibrated samples, stored within database storage module 150, and spectral analysis module 140 compares the results of the analysis against its calibration groups. If the results of the validation are consistent with the calibration groups, the calibration group is validated. If the results of the validation are not consistent with the calibration groups, correction factors are issued for the calibration groups, and the spectral analysis module 140 repeats the validation process. Spectral analysis module 140 is also capable of printing calibration certificates that have been assigned to each calibration group. In an embodiment, the spectral analysis module 140 performs spectral selection of the collected spectral data. The spectral analysis module 140 performs spectral selection based on the intensity of the spectral features present inside a particular spectral record. In an embodiment, spectral analysis module 140 performs a spectral selection based on the intensity of the spectral area being higher than a threshold value. In an embodiment, spectral analysis module 140 performs a spectral selection based on a deviation from the commonly occurring absorption intensity in the area. Spectral analysis module 140 is capable of performing automatic or manual selection of the spectral regions of interest for further spectral analysis of the spectral data.

In an embodiment, the spectral analysis module 140 uses defined spectral analysis methods such that the analysis methods perform spectral analysis of spectral data. In an embodiment, spectral analysis module 140 uses quantification analysis techniques to analyze spectral data. In an embodiment, spectral analysis module 140 uses qualitative analysis techniques to analyze spectral data. During quantification analysis, the spectral analysis module 140 uses a defined quantification analysis algorithm to establish the concentration and presence of predefined components within a particular set of spectral data. In an embodiment, quantification methods used to analyze spectral data are stored and executed by a quantification analysis engine that is part of the spectral analysis module 140. The quantification analysis engine can provide a collection of algorithms that support chemometric methods for quantitative and qualitative analysis of spectral data. An example of a quantification method used by the spectral analysis module 140 for analyzing spectral data is the Enhanced Weighted Multi-Band Classical Least Squares (EWMBCLS) algorithm. Other quantification methods that can be supported by spectral analysis module 140, include, but are not limited to, indirect least squares (ILS), partial least squares (PLS), weighted multi-band classical least squares, and principal components regression (PCR). A more detailed discussion of weighted multi-band classical least squares spectral analysis can be found in Applicant's prior U.S. Pat. No. 6,748,334.

The EWMBCLS algorithm provides a list of desirable features, including, but not limited to: auto-selection of best fit spectrum over a quantification range; warning when calibration is out of range; non-linear correction curve selection per band (linear, $2^{nd}$ degree polynomial, $3^{rd}$ degree polynomial, and exponential); quantification analysis over the entire transmission spectrum; capability of selecting quantification bands for low, medium, and high concentrations with automatic band selection; allows for a reference spectrum to be subtracted from the sample spectrum by a fixed amount of by a calculated amount; capability of adjusting the zero reference value per molecular compound; calibration expiration management; reports concentration using a variety of units per molecular compound (%, ppm, ppb, $g/m^3$, etc.); and area under the curve analysis.

Through EWMBCLS, the quantification analysis of the spectral data is divided into multiple absorption bands for each analyte. Each absorption band is independently baseline corrected, quantified, and corrected for non-linear concentration values. Each absorption band is assigned an independent quantification range that is calculated automatically. After an initial concentration estimation of the analytes present in a particular gas sample is made, the calibrated absorption spectrum of each analyte that is closer to the actual concentration is selected for final fitting and analysis. Each absorption band is assigned a weighting factor that is based on the absorption intensity of the band and its residual spectrum. The concentration of each analyte is finally calculated by performing a weighted average on the concentration reported by each band of the analyte. The final, non-linear correction curve is optimized to work around the concentration of each analyte. Finally, feedback from system 100 based on the sample pressure and temperature to the spectral analysis module 140 provides a concentration correction based on the ideal gas law. A further discussion of EWMBCLS techniques can be found in "ARIA™: Self-Optimizing Specialty Gas Calibration Error-Reduction Software (2009)."

Figure 2:
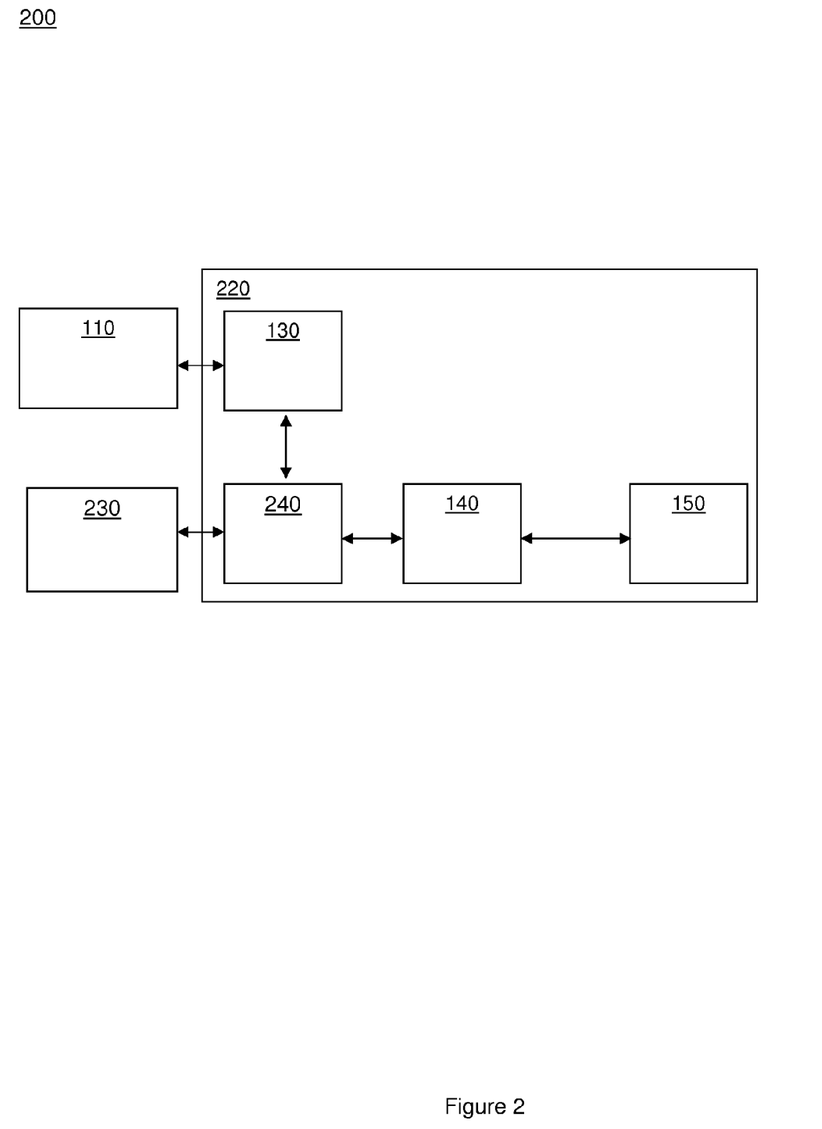
FIG. 2 is a block diagram of a system for collecting spectral data in accordance with another embodiment of the present invention.

FIG. 2 illustrates a system 200 for collecting spectral data in accordance with an embodiment of the present invention. System 200 contains a programmable logic controller (PLC) 230 in electrical communication with workstation 220 by way of hardware control module 240. Workstation 220 is also in electrical communication with spectrometer 110. Workstation 220 contains all the various components and functionality of workstation 120 (spectral collection module 130, spectral analysis module 140, and database storage module 150) as described in FIG. 1 and the paragraphs above. In an embodiment, workstation 220 is a personal computer. In an embodiment, workstation 220 contains computer-readable media loaded on internal memory, the computer-readable media further comprising a hardware control module 240 that is in electrical communication with spectral collection module 130, spectral analysis module 140, and programmable logic controller 230.

Hardware control module 240 is automated and synchronized with all other hardware operations in system 200 through the use of programmable logic controller 230. These operations can include the interconnection of other analytical instrumentation into system 200 to perform tasks, including, but not limited to, control of automated manifold systems, control of alarm systems, pressure and temperature control and feedback, activation of alarms (sound, light, vibration, etc.), or any other tasks preferably selected by a customer. In an embodiment, spectral analysis module 140 provides feedback to both spectral collection module 130 and hardware control module 240 in order to further enhance the automation of system 200 and to further enhance the quality of spectral data being processed. Hardware control module 240 controls communication with PLC 230. Hardware control module 240 also provides feedback to spectral analysis module 140 and/or spectral collection module 130 to further enhance the quality of spectral data being collected and analyzed. In an embodiment, hardware control module 240 provides feedback to system 200 including information related to pressure, temperature, flow rates, type of sample present, sample concentrations from other analytical instrumentation, etc.

In an embodiment, spectral analysis module 140 is configured to receive both spectral data, and data (or feedback) issued from hardware control module 240, for further processing. Spectral analysis module 140 can issue commands to all modules within system 200, wherein the commands are based on information extracted from spectral data and/or information extracted from data issued from hardware control module 240. Spectral analysis module 140 and hardware control module 240 both have capability of transmitting data and information related to the processes of spectrometer 110 and any other instrumentation connected to PLC 230 to database storage module 150 for storage for future use.

Furthermore, in an embodiment, hardware control module 240 queries the configuration of PLC 230 to discover the specific hardware that is attached to PLC 230. In an embodiment, a variety of external scientific analysis hardware can be attached to PLC 230, including, but not limited to an $O_2$ analyzer, $H_2$ analyzer, THC analyzer, pressure and temperature transducers, flow meters, electrochemical cells, flame ionization detectors (FIDs), residual gas analyzers (RGA), or any other scientific analysis instrument used to monitor a physical or chemical phenomena as chosen by a user. Hardware control module 240 controls external hardware through communication with PLC 230. In an embodiment, hardware control module 240 synchronizes and coordinates external hardware operations with spectral collection module 130. In an embodiment, hardware control module 240 performs coordination and synchronization of hardware with spectral collection module 130 through an automation script that is based on the application at hand. An automation script is a programmed instruction or set of instructions to activate or control other operations within system 200. Hardware control module 240 validates the communication between workstation 220 and PLC 230. In an embodiment, hardware control module 240 issues an alarm when detecting a communication error between PLC 230, or hardware attached to PLC 230, and workstation 220. In an embodiment, hardware control module 240 provides status updates on all hardware attached to PLC 230. In an embodiment, hardware control module 240 provides capability of communicating with more than one programmable logic controller at a time. In an embodiment, hardware control module 240 is capable of sending electronic signals between all the modules of system 200 using standard communications protocols like analog, digital, MODBUS, Device Net, SEMI Equipment Communications Standard/Generic Model For Communications (SECS/GEM), or Ethernet.

Figure 3:
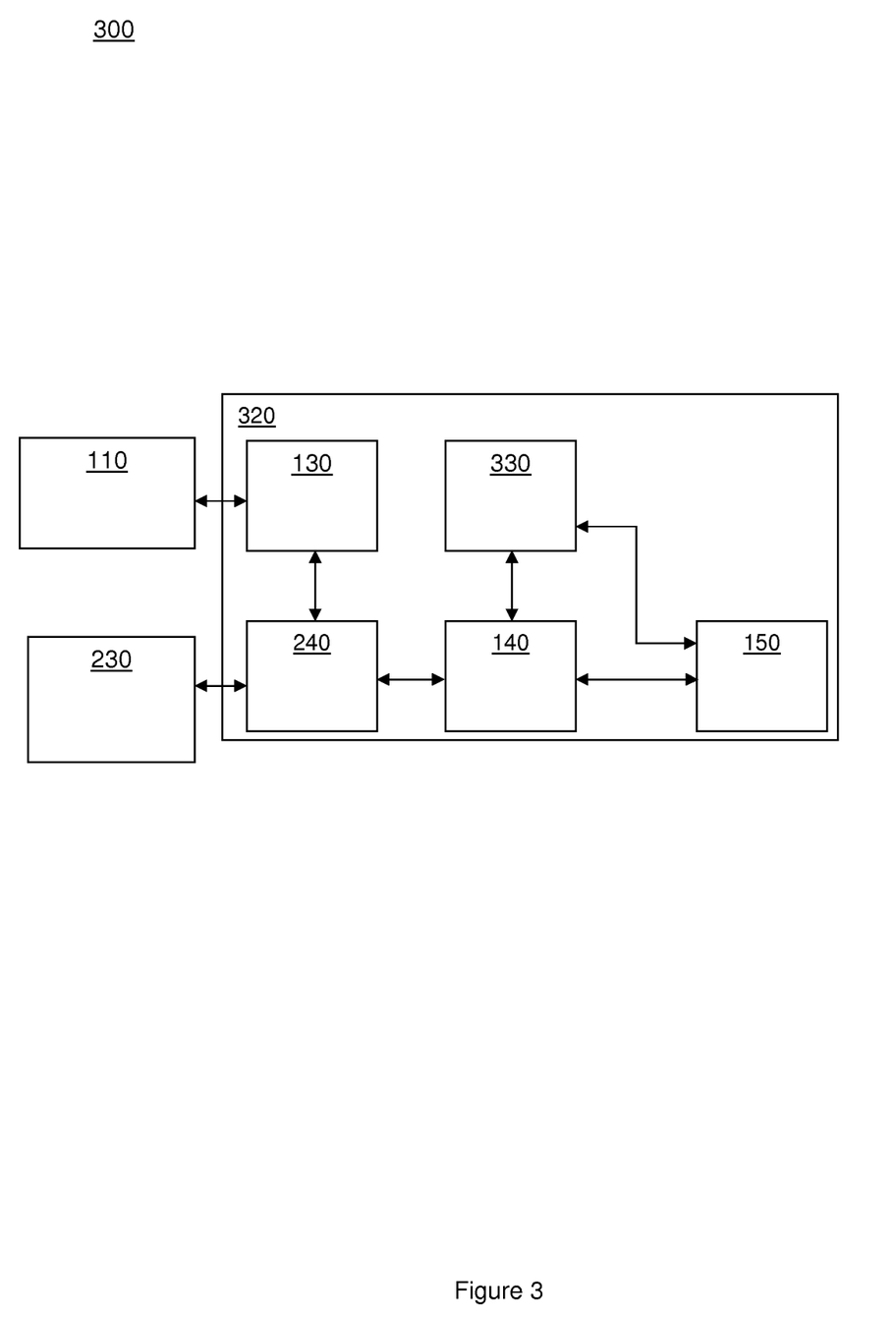
FIG. 3 is a block diagram of a system for collecting spectral data in accordance with another embodiment of the present invention.

FIG. 3 illustrates a system 300 for collecting spectral data in accordance with an embodiment of the present invention. System 300 comprises spectrometer 110, programmable logic controller (PLC) 230, and workstation 320. Workstation 320 contains all the various components and functionality of workstation 220 (spectral collection module 130, spectral analysis module 140, hardware control module 240, and database storage module 150) as described in FIG. 2 and the paragraphs above. Workstation 320 further comprises a user interface module 330 supported on computer readable media loaded within internal memory of workstation 320. In an embodiment, workstation 320 is a personal computer. User interface module 330 is in communication with spectral analysis module 140 and database storage module 150. Spectrometer 110 is in direct electrical communication with workstation 320 by way of spectral collection module 130. Programmable logic controller 320 is in direct electrical communication with workstation 320 by way of hardware control module 240.

User interface module 330 provides oversight of all processes within system 300. User interface module 330 verifies the real-time status of all components (both hardware and software) within system 300 by way of electrical communication with spectral analysis module 140. When spectral analysis module 140 receives data and feedback from other modules within system 300, this information is immediately transferred to user interface module 330 such that appropriate actions can be taken to ensure efficient operation of system 300. In an embodiment, appropriate actions that can be taken by user interface module 330 include, but are not limited to, wavelength range adjustments, scan rate adjustments, spectral resolution adjustments, signal gain adjustment, selection of spectral analysis algorithms, selection of calibration groups, initiating a calibration or validation process. In an embodiment, user interface module 330 reviews historical spectral records by querying database storage module 150. Based on information in these historical spectral records, user interface module 330 can transmit an electrical signal, or commands, to adjust processing parameters within one or more than one modules supported by system 300. By querying database storage module 150, user interface module 330 can display, to a user: the current status of system 300; the results of a concentration analysis of a set of spectral data; various historical records and/or reports; trend analysis of historical records; and process characterization based on the trend analysis. In an embodiment, user interface module 330 queries database storage module 150 to retrieve: the current status of system 300; the results of a concentration analysis of a set of spectral data; and various historical records and/or reports. User interface module 330 is further configured to print and/or display any of the information retrieved from database storage module 150. Depending on the particular application for system 300, user interface module 330 can provide quality assurance of all chemical substances being manufactured, including process characterization and process deviation information. Possible areas of application for system 300 include, but are not limited to: quality assurance laboratories, process control and automation, environmental studies, Occupational Safety and Health Administration (OSHA) regulations for air quality, stack emissions, gas and chemical manufacturers, petrochemical applications, EPA regulations for stack gas emissions, oil and gas refinery operations, astronautical/space science and technology applications, and pharmaceutical applications.

Figure 4:
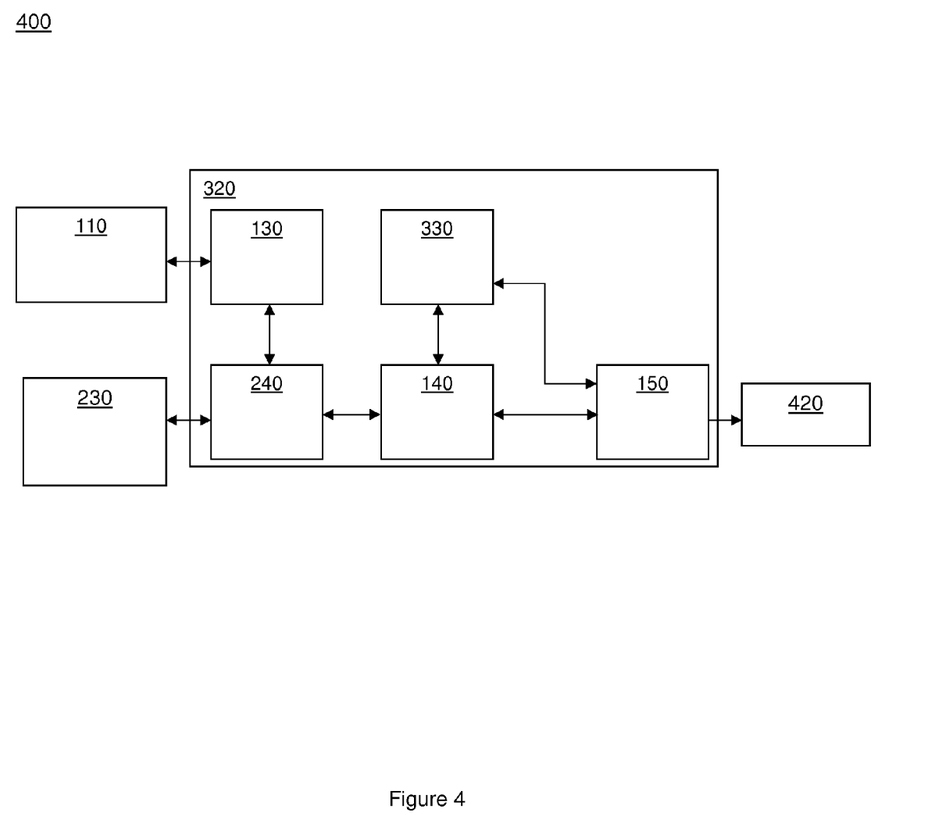
FIG. 4 is a block diagram of a system for collecting spectral data and storing spectral data in a centralized database in accordance with an embodiment of the present invention.

FIG. 4 illustrates a system 400 for collecting spectral data and storing spectral data in a centralized database 420 in accordance with an embodiment of the present invention.

System 400 contains all the components and functionality of system 300 as described in FIG. 3 and the paragraphs above. System 400 further comprises a centralized database 420 electrically connected to workstation 320 by way of database storage module 150. In an embodiment, centralized database 420 is selected from a list of commercially available databases, including, but not limited to MySQL, Oracle, or Microsoft SQL Server, DB2. In an embodiment, centralized database 420 has direct electrical communication with all modules and hardware contained within system 400 in order to exert proper control and diagnostics of operation throughout system 400. In an embodiment, data and tables stored within centralized database 420 are completely defined and interrelated in an open format. In an embodiment, multiple data collection systems can be electrically connected to centralized database 420 in order to store data and system information unique to each data collection system contained within a particular environment. Within a larger analytical environment, a user (or quality control agent) is able to easily query information stored in centralized database 420 in order to monitor the status of the user's larger organizational data network. In an embodiment, additional user interface modules 330 can be developed to mine and extract additional information from centralized database 420. In an embodiment, user interface module 330 can be configured to mine centralized database 420 for gas certification and/or process monitoring information. In an embodiment, user interface module 330 can be configured to mine centralized database 420 for information including, but not limited to: a gas tank's performance history; production efficiency of system 400; staff performance; equipment performance; equipment maintenance scheduling; process characterization; process validations; end point detection; or gas purifier performance. This information can be used to detect patterns of operation, trends, processes characterization, quality control, and quality assurance reports, or other creative ways to maximize the usefulness of all the collected data. The additional user interface modules 330 can be developed within the user's own organization or by 3rd party software developing houses. In an embodiment, a user or a group or users can control access to centralized database 420. In an embodiment, user interface module 330 can be configured to mine centralized database 420 for data including, but not limited to: instrument parameters, lab personnel, quantification analysis, test procedures, process line ID, process point, calibration certifications, sampling matrix, gas matrix certification, instrument validation, spectral records, and a particular instrument's signal-to-noise ratio.

Further hardware and data collection techniques that can be adapted with either system 100, 200, 300, or 400 can include, but are not limited to, Raman spectroscopy, Nuclear magnetic resonance, Nuclear quadrupole resonance, Microwave spectroscopy, Gamma Ray spectroscopy, Electron spin resonance, Mass spectrometry, Atomic absorption spectroscopy, UV-VIS absorption spectroscopy, Molecular fluorescence spectroscopy, Electronic fluorescence spectroscopy, Infrared and near-infrared spectroscopy, Electron paramagnetic resonance spectroscopy, X-Ray Fluorescence spectroscopy, X-Ray photoelectron spectroscopy, Mossbauer spectroscopy, Rayleigh scattering, Brillouin scattering, Terahertz spectroscopy, FTIR spectroscopy, Cavity Ring Down Spectroscopy (CRDS), Laser Induced Breakdown Spectroscopy, Differential Optical Absorption Spectroscopy, and Tunable Diode Laser Spectroscopy (TLDAS).

While the invention has been particularly shown and described with reference to a preferred embodiment and various alternate embodiments, it will be understood by persons skilled in the relevant art that various changes in form and details can be made therein without departing from the spirit and scope of the invention Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

We claim:

1. A spectral analysis system comprising:
a receiving means configured to receive an electromagnetic signal and convert the electromagnetic signal into a first electrical signal;
a collecting means configured to receive said first electrical signal and convert the first electrical signal into a second electrical signal suitable for electronics processing;
and a processing means configured to receive the second electrical signal and extract information embedded within the second electrical signal, wherein the processing means is further configured to transmit a first command to the collecting means, wherein the first command is based on the information extracted from the second electrical signal, wherein the collecting means is further configured to receive and execute the first command transmitted from the processing means.

2. The spectral analysis system of claim 1, wherein said processing means is further configured to transmit the information extracted from the second electrical signal to a database storage means, wherein the information extracted from the second electrical signal is stored in said database storage means.

3. The spectral analysis system of claim 2, wherein said database storage means comprises a commercially available database.

4. The spectral analysis system of claim 1, wherein said receiving means comprises an instrument that can scan and report a portion of the electromagnetic radiation spectrum.

5. The spectral analysis system of claim 1, wherein said collecting means and said processing means are loaded on digital-readable media stored within an electronic processing device.

6. The spectral analysis system of claim 1, wherein said collecting means issues a second command, wherein the second command is based on instructions embedded within the first command and wherein the second command is transmitted from the collecting means to the receiving means and the second command is executed by the receiving means.

7. The spectral analysis system of claim 1, wherein the first command is one of: collect a reference spectrum; collect a sample spectrum; start continuous reference and sample spectrum; stop collection; modify scan time; change instrument resolution; or change wavelength range to scan.

8. A spectral analysis system comprising:
a receiving means configured to receive an electromagnetic signal and convert the electromagnetic signal into a first electrical signal;

a collecting means configured to receive said first electrical signal from the receiving means and convert the first electrical signal into a second electrical signal suitable for electronics processing;

a detecting means configured to detect a response to a physical-chemical phenomena and to convert the response to the physical-chemical phenomena into a third electrical signal, wherein the third electrical signal is suitable for electronics processing;

and a processing means configured to receive both the second electrical signal and the third electrical signals, wherein the processing means is further configured to extract information embedded within the second and third electrical signals and to transmit a first command to the collecting means, wherein the collecting means is further configured to receive and execute the first command transmitted from the processing means, the first command being based on the information extracted from the second and third electrical signals.

9. The spectral analysis system of claim 8, wherein said processing means is further configured to transmit the information extracted from the second and third electrical signals to a database storage means, wherein the information extracted from the second and third electrical signals is received and stored by said database storage means.

10. The spectral analysis system of claim 9 further comprising a first user interface, wherein said first user interface is configured to issue a first query to said database storage means.

11. The spectral analysis system of claim 10, wherein the first query comprises a second command issued from said first user interface means to said database storage means for retrieving the information extracted from the second or third electrical signals.

12. The spectral analysis system of claim 11, wherein said first user interface is configured to receive, from the database storage means, the information extracted from the second or third electrical signals, wherein said first user interface is further configured to display the information extracted from the second or third electrical signals.

13. The spectral analysis system of claim 10 further comprising a second user interface, wherein said second user interface is configured to issue a second query to said database storage means.

14. The spectral analysis system of claim 9, wherein said collecting means, said processing means, and said database storage means are loaded on computer-readable media stored on a personal computer.

15. The spectral analysis system of claim 9, wherein said database storage means is loaded on computer-readable media stored on a separate personal computer than said processing means and said collecting means, wherein said database storage means is in electrical communication with said processing means.

16. The spectral analysis system of claim 8, wherein the detecting means comprises a physical-chemical sensor.

17. The spectral analysis system of claim 8, wherein the receiving means comprises an instrument that can scan and report a portion of the electromagnetic radiation spectrum.

18. The spectral analysis system of claim 1, wherein the first command instructs the receiving means to make a first adjustment.

19. The spectral analysis system of claim 18, wherein the first adjustment is one of wavelength range adjustment, scan rate adjustment, signal gain adjustment, or spectral resolution adjustment.

20. The spectral analysis system of claim 8, wherein the processing means is further configured to analyze said second and/or said third electrical signal through the use of an enhanced weighted multi-band classical least squares algorithm.

21. A method for analyzing spectral data comprising:
receiving an electromagnetic signal;
converting the electromagnetic signal into a first electrical signal;
collecting said first electrical signal;
converting said first electrical signal into a second electrical signal suitable for electronics processing;
detecting a response to a physical phenomena and converting the response to the physical phenomena into a third electrical signal, wherein the third electrical signal is suitable for electronics processing;
and processing both the second electrical signal and the third electrical signals, wherein the processing step further comprises extracting information embedded within the second and third electrical signals and transmitting a first command, wherein the first command is received and executed by a device suitable for receiving electromagnetic energy, the first command being based on the information extracted from the second and third electrical signals.

* * * * *